(No Model.)

A. GOLDMAN.
APPARATUS FOR THE MANUFACTURE OF CREAM OF TARTAR.

No. 306,242. Patented Oct. 7, 1884.

WITNESSES:

INVENTOR:
A. Goldman
BY Munn & Co
ATTORNEYS.

UNITED STATES PATENT OFFICE.

ALBERT GOLDMAN, OF HOBOKEN, NEW JERSEY.

APPARATUS FOR THE MANUFACTURE OF CREAM OF TARTAR.

SPECIFICATION forming part of Letters Patent No. 306,242, dated October 7, 1884.

Application filed February 21, 1884. (No model.)

*To all whom it may concern:*

Be it known that I, ALBERT GOLDMAN, of Hoboken, in the county of Hudson and State of New Jersey, have invented a new and useful Improvement in Dissolving-Vessels for Making Cream of Tartar, of which the following is a full, clear, and exact description.

Reference is to be had to the accompanying drawings, forming a part of this specification, in which similar letters of reference indicate corresponding parts in both the figures.

Figure 1:
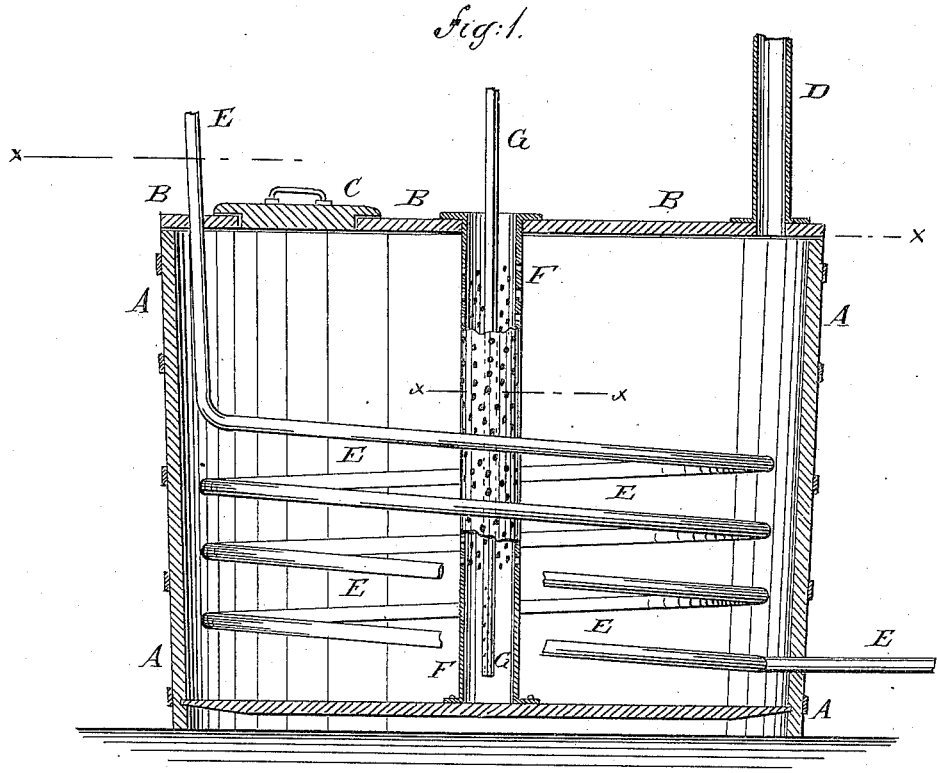
Figure 2:
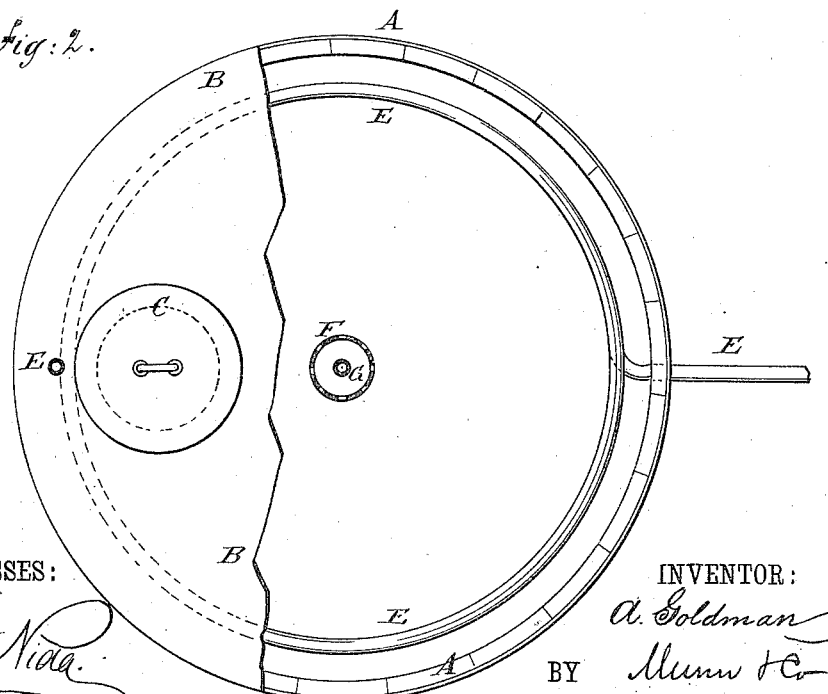

Figure 1 is a sectional side elevation of my improvement. Fig. 2 is a plan view of the same, part of the cover being broken away, and the perforated cylinder being shown in section through the line $x\ x$, Fig. 1.

The object of this invention is to facilitate the dissolving of the chemicals in making cream of tartar, and promote thoroughness in such dissolving.

The invention consists in a dissolving-vessel constructed with a tank, having a cover and a coil of heating-pipe, and provided with a perforated hollow cylinder placed within the said tank to receive the chemicals, and a perforated pipe placed within the said cylinder to introduce steam for dissolving the said chemicals, as will be hereinafter fully described.

A represents a wooden tank twenty-five feet in diameter and sixteen feet in height, or of any other suitable size, and which is provided with a closely-fitting cover, B. The cover B is provided with a man-hole closed by a cover, C, and with a chimney or flue, D, for the escape of the exhaust-steam.

Within the tank A is placed a coil, E, of pipe to receive steam for heating the contents of the said tank. The inlet end of the coil E passes through the cover B, and the outlet end of the said coil passes out through the lower part of the side of the tank A, as shown in Figs. 1 and 2.

Within the tank A is placed a hollow copper cylinder, F, three feet (more or less) in diameter to receive the chemicals to be dissolved. The upper and middle parts of the cylinder F are perforated with numerous small holes to allow the boiling liquid in the tank A to circulate freely through the said cylinder. The lower part of the cylinder F is without perforations, as shown in Fig. 1.

Through the center of the cylinder F passes a pipe, G, to introduce live steam into the said cylinder. The pipe G extends nearly to the bottom of the cylinder F, has its lower end closed, and has numerous perforations in its lower part, as shown in Fig. 1. The chemicals to be dissolved are thrown into the cylinder F gradually until the desired amount has been introduced into the tank. With this construction, as the chemicals fall through the cylinder F, they are met by the steam from the pipe G and are at once dissolved, and are then evenly distributed through the liquid in the tank A by the boiling of the said liquid, so that no undissolved chemicals will be left on the bottom of the tank on account of the difficulty of agitating the contents of the said tank by mechanical means.

Having thus described my invention, I claim as new and desire to secure by Letters Patent—

1. A dissolving-vessel constructed substantially as herein shown and described, and consisting of the tank A, provided with a cover, B, a coil, E, of heating-pipe, a perforated hollow cylinder, F, placed in the said tank, and a perforated steam-pipe, G, placed in the said cylinder, as set forth.

2. In a dissolving-vessel, the combination, with the tank A and its cover B, of the perforated hollow cylinder F and the perforated steam-pipe G, substantially as herein shown and described.

ALBERT GOLDMAN.

Witnesses:
   JAMES T. GRAHAM,
   EDGAR TATE.